(12) United States Patent
Matsubara et al.

(10) Patent No.: US 12,317,399 B2
(45) Date of Patent: May 27, 2025

(54) VOLTAGE GENERATOR

(71) Applicant: Mitsubishi Electric Corporation, Tokyo (JP)

(72) Inventors: Noriyuki Matsubara, Tokyo (JP); Fumihito Izawa, Tokyo (JP); Yohei Araki, Tokyo (JP); Yuya Yamashita, Amagasaki (JP); Masato Achihara, Amagasaki (JP)

(73) Assignee: Mitsubishi Electric Corporation, Tokyo (JP)

(*) Notice: Subject to any disclaimer, the term of this patent is extended or adjusted under 35 U.S.C. 154(b) by 435 days.

(21) Appl. No.: 17/918,989

(22) PCT Filed: Jun. 7, 2021

(86) PCT No.: PCT/JP2021/021553
§ 371 (c)(1),
(2) Date: Oct. 14, 2022

(87) PCT Pub. No.: WO2021/251334
PCT Pub. Date: Dec. 16, 2021

(65) Prior Publication Data
US 2023/0238175 A1 Jul. 27, 2023

(30) Foreign Application Priority Data
Jun. 10, 2020 (JP) .................. 2020-100893

(51) Int. Cl.
*H05G 1/10* (2006.01)
*H02M 7/10* (2006.01)
*H05G 1/32* (2006.01)

(52) U.S. Cl.
CPC .............. *H05G 1/10* (2013.01); *H05G 1/32* (2013.01); *H02M 7/106* (2013.01)

(58) Field of Classification Search
CPC .. H05G 1/10; H05G 1/12; H05G 1/32; H02M 7/106
See application file for complete search history.

(56) References Cited

U.S. PATENT DOCUMENTS 8,553,841 B2 * 10/2013 Cooley .................... H05G 1/12
378/112
10,020,157 B2 * 7/2018 Hadland .................. H05G 1/12
(Continued)

FOREIGN PATENT DOCUMENTS

JP H1041093 A 2/1998
JP 2008041318 A 2/2008
(Continued)

OTHER PUBLICATIONS

Decision of Refusal dated Jan. 30, 2024, issued in the corresponding Japanese Patent Application No. 2022-530550, 5 pages including 2 pages of English Translation.
(Continued)

*Primary Examiner* — Jue Zhang
(74) *Attorney, Agent, or Firm* — BUCHANAN, INGERSOLL & ROONEY PC

(57) ABSTRACT

A voltage generator includes: a sealed case having a ground potential; a high-voltage transformer that is housed in the sealed case and boosts a voltage; a booster circuitry that is housed in the sealed case and boosts a voltage outputted from the high-voltage transformer; and a voltage detector that is housed in the sealed case and detects a voltage boosted by the booster circuitry. A first creepage path ranging from a high-voltage portion, which is a portion to which a highest voltage is applied in the voltage detector, to a ground point having an equal potential to the sealed case includes a first bent path, which is a bent path.

17 Claims, 9 Drawing Sheets

(56) References Cited

U.S. PATENT DOCUMENTS

2008/0107235 A1* 5/2008 Sundaram ............... H05G 1/10
378/101
2009/0316859 A1 12/2009 Tijima et al.
2016/0286636 A1* 9/2016 Ogawa .................... H05G 1/32

FOREIGN PATENT DOCUMENTS

JP       2013042580 A    2/2013
JP       2013178878 A    9/2013
WO       2008050540 A1   5/2008

OTHER PUBLICATIONS

Notice of Reasons for Refusal dated Jul. 4, 2023, issued in the corresponding Japanese Patent Application No. 2022-530550, 6 pages including 4 pages of English Translation.
International Search Report (PCT/ISA/210) with translation and Written Opinion (PCT/ISA/237) mailed on Aug. 17, 2021, by the Japan Patent Office as the International Searching Authority for International Application No. PCT/JP2021/021553. (9 pages).

* cited by examiner

VOLTAGE GENERATOR

FIELD

The present disclosure relates to a voltage generator for boosting a voltage.

BACKGROUND

There is a voltage generator that generates a high voltage with a booster circuit using a Cockcroft circuit. In this voltage generator, a plurality of insulating substrates on which a booster circuit and the like are arranged are stacked, and the voltage is boosted stepwise by each booster circuit to generate a DC high voltage.

For example, in a voltage generator described in Patent Literature 1, discoidal insulating substrates including a booster circuit are stacked and housed in a cylindrical sealed case. In this voltage generator, a capacitor and a diode constituting a Cockcroft circuit are arranged symmetrically about a line passing through a center of a circle of the disc as a target axis, thereby achieving both downsizing and discharge suppression.

CITATION LIST

Patent Literature

Patent Literature 1: Japanese Patent Application Laid-open No. 2013-178878

SUMMARY

Technical Problem

However, according to the technique of Patent Literature 1 described above, in an insulating substrate that is arranged at an uppermost stage and the like in the voltage generator and to which a high voltage is applied, sufficient insulation performance has been unable to be secured unless a linear distance between a portion to which a highest voltage is applied and a portion to which a lowest voltage is applied is increased. For this reason, there has been a problem that the voltage generator becomes large.

The present disclosure has been made in view of the above, and an object thereof is to provide a voltage generator that can achieve downsizing while ensuring high insulation performance.

Solution to Problem

In order to solve the above-described problem and achieve the object, a voltage generator of the present disclosure includes: a case having a ground potential; a high-voltage transformer that is housed in the case and boosts a voltage; a booster circuitry that is housed in the case and boosts a voltage outputted from the high-voltage transformer; and a voltage detector that is housed in the case and detects a voltage boosted by the booster circuitry. A first bent path which is a bent path is included in a first creepage path from a first high-voltage portion, which is a portion to which a highest voltage is applied in the voltage detector, to a ground point having an equal potential to the case.

Advantageous Effects of Invention

According to the present disclosure, it is possible to achieve downsizing while ensuring high insulation performance of a voltage generator.

DESCRIPTION OF EMBODIMENTS

Hereinafter, embodiments of a voltage generator according to the present disclosure will be described in detail with reference to the drawings.

First Embodiment

Figure 1:
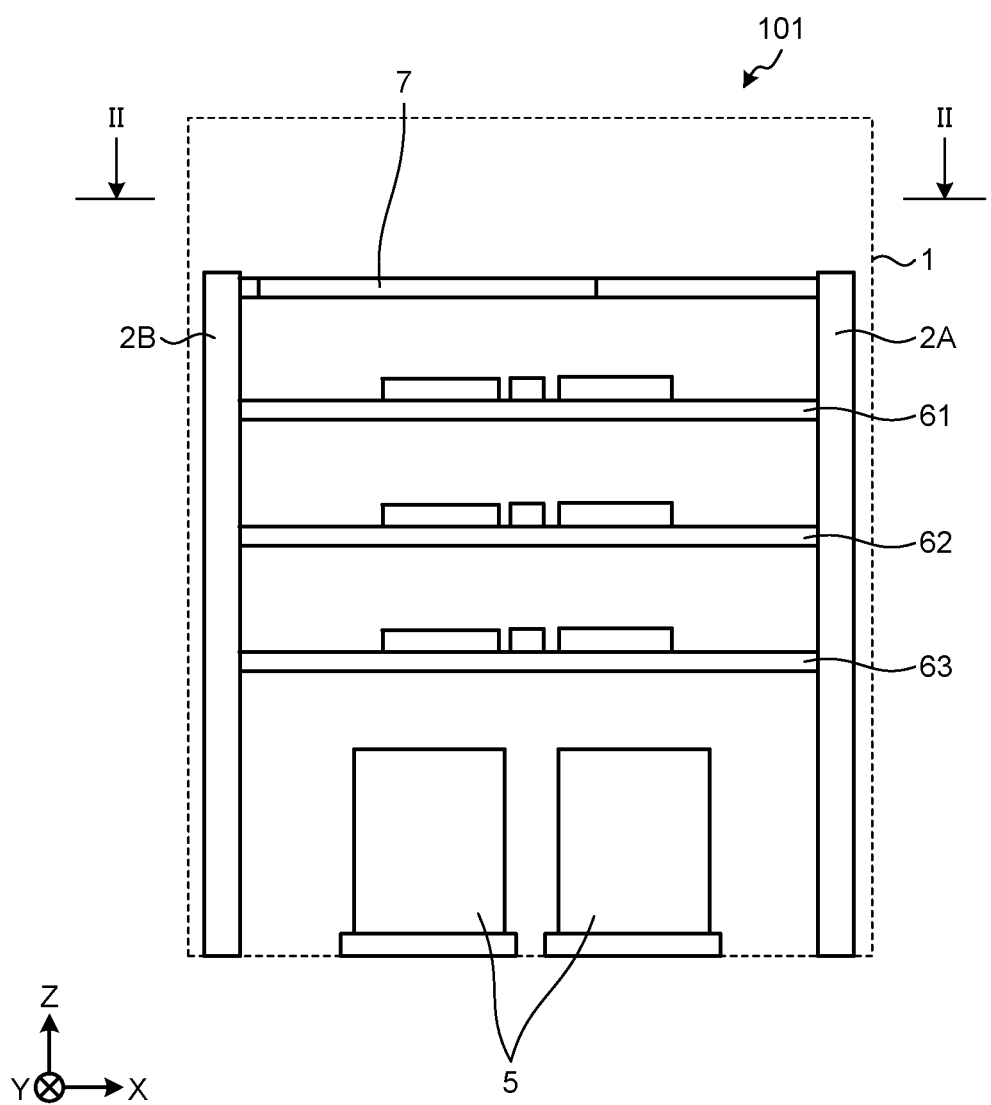
FIG. 1 is a view illustrating a configuration of a voltage generator according to a first embodiment.

FIG. 1 is a view illustrating a configuration of a voltage generator according to a first embodiment. FIG. 1 illustrates a mounting structure of an insulating substrate included in a voltage generator 101, that is, an assembly structure of the voltage generator 101. FIG. 1 illustrates a cross-sectional view of a cylindrical sealed case 1 in which a disk-shaped insulating substrate is disposed, when the sealed case 1 is cut along a plane including a cylinder axis. Note that, in the following description, a bottom surface side of the sealed case 1 is referred to as a lower side, and a top surface side of the sealed case 1 is referred to as an upper side. Further, in the following description, two axes that are in a plane parallel to the top surface of the insulating substrate and are orthogonal to each other are defined as an X axis and a Y axis. In addition, an axis orthogonal to the X axis and the Y axis is defined as a Z axis. FIG. 1 is a cross-sectional view of the voltage generator 101 taken along an XZ plane.

The voltage generator 101 includes the sealed case 1 that is a case having a ground potential, and support columns 2A and 2B. In addition, the voltage generator 101 includes a high-voltage generator including a high-voltage transformer 5, booster circuitries 61 to 63, and a voltage detector 7. In the first embodiment, a case where the booster circuitries included in the voltage generator 101 are the booster circuitries 61 to 63 will be described, but the number of booster circuitries may be two or four or more.

The booster circuitries 61 to 63 are circuitries disposed on a disk-shaped insulating substrate, and execute boosting. In the booster circuitries 61 to 63, a Cockcroft circuit is disposed. The booster circuitries 61 to 63 perform feedback control by using a signal detected by the voltage detector 7, in order to improve stability of a high voltage.

In the voltage generator 101, the booster circuitries 61 to 63 and the voltage detector 7 are disposed so as to be parallel to the XY plane, and the support columns 2A and 2B are disposed so as to be parallel to the Z-axis direction. When the high-voltage generator is put into the sealed case 1, the high-voltage generator is attached to the two support columns 2A and 2B provided to face an inner wall of the sealed case 1.

At a bottom part of the sealed case 1, two high-voltage transformers 5 are disposed. In the sealed case 1, the booster circuitries 61 to 63 are disposed above the high-voltage transformer 5. The booster circuitries 61 to 63 are stacked at equal intervals in the sealed case 1.

The booster circuitry 63 is a first-stage unit from the bottom, the booster circuitry 62 is a second-stage unit from the bottom, and the booster circuitry 61 is a third-stage unit from the bottom. Further, in the sealed case 1, the voltage detector 7 is disposed above the booster circuitry 61. The booster circuitries 61 to 63 and the voltage detector 7 are disposed such that top and bottom surfaces thereof are parallel to each other.

Further, in the voltage generator 101, in order to improve an insulation property in the voltage generator 101, the booster circuitries 61 to 63 and the voltage detector 7 are disposed apart from each other by a specific distance. Further, in the voltage generator 101, in order to improve an insulation property in the voltage generator 101, an inside of the sealed case 1 is filled with an insulating material (an insulating layer to be described later) such as gas, oil, or resin having higher insulation performance than air. In addition, examples of a gaseous form of the insulating material such as gas additionally include dry air, nitrogen, hydrogen, and sulfur hexa fluoride.

In addition, in the voltage generator 101, in order to suppress concentration of electric lines of force at a portion having a high potential with respect to the sealed case 1, measures such as covering with metal in which an electric field is relaxed are taken as structural approach. An ideal structure for suppressing concentration of electric lines of force is a shape close to a sphere without an edge.

The two high-voltage transformers 5 are electrically connected to each other. Further, the high-voltage transformers 5 are electrically connected to the booster circuitry 63. The booster circuitry 63 is electrically connected to the booster circuitry 62, and the booster circuitry 62 is electrically connected to the booster circuitry 61.

The high-voltage transformers 5 are connected to an inverter circuit (not illustrated), and boost output of the inverter circuit to a range of minus several kV to minus several tens of kV.

The booster circuitry 63 boosts an output voltage of the high-voltage transformer 5 to 10 kV to 30 kV which is 3 to 6 times, the booster circuitry 62 boosts an output voltage of the booster circuitry 63 by 3 to 6 times, and the booster circuitry 61 boosts an output voltage of the booster circuitry 62 by 3 to 6 times. The DC high voltage boosted by the booster circuitry 61 is outputted to the outside.

For example, when a generated voltage per unit of the booster circuitries 61 to 63 is 20 kV, a high voltage of 80 kV can be generated by connecting four units of the booster circuitry in series. In addition, when the voltage generator 101 requires a higher voltage, it is possible to cope with this by increasing the number of series booster circuitries that generate a high voltage. In this way, by increasing or decreasing the number of the series booster circuitries, the voltage generator 101 can generate an arbitrary high voltage.

The voltage detector 7 is a detector arranged on a disk-shaped insulating substrate. The voltage detector 7 detects a high voltage boosted by the booster circuitry 61 in order to improve stability of the high voltage generated by the booster circuitry 61. That is, the voltage detector 7 monitors a high voltage outputted from the booster circuitry 61. As described above, in a case where the voltage generator 101 generates a high voltage, the number of units of the booster circuitry is increased, but a strength against vibration significantly decreases as the number of stacked stages is increased. Therefore, in the voltage generator 101, the booster circuitries 61 to 63 and the voltage detector 7 are fixed to the support columns 2A and 2B in consideration of insulation from the two support columns 2A and 2B provided inside the sealed case 1.

Figure 2:
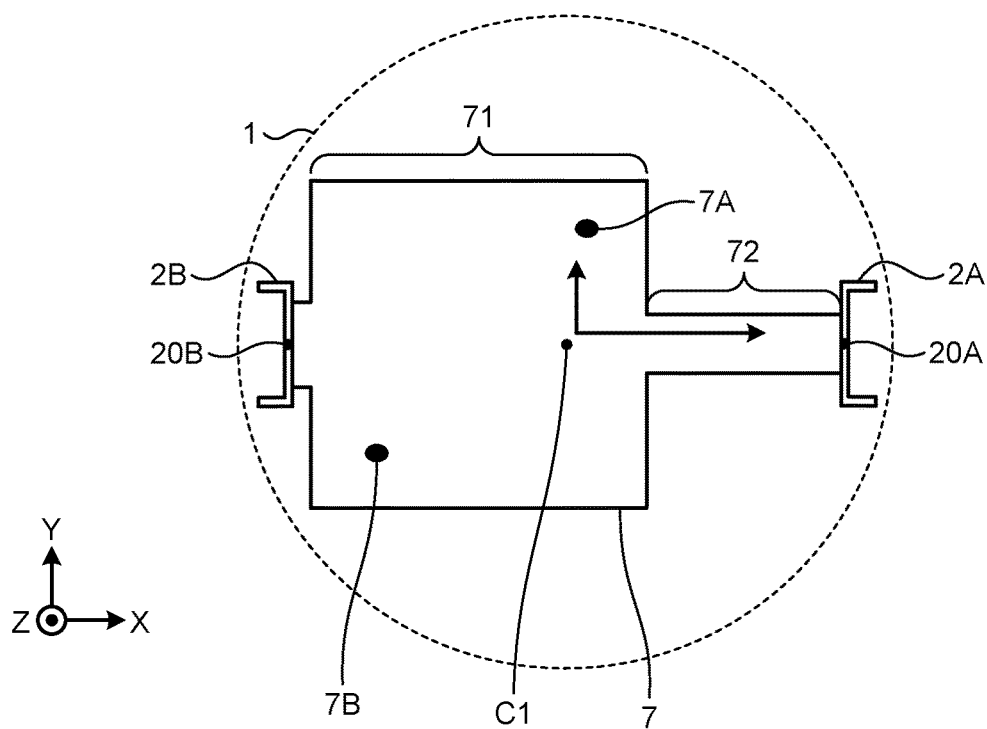
FIG. 2 is a view illustrating a configuration of a voltage detector included in the voltage generator according to the first embodiment.

FIG. 2 is a view illustrating a configuration of a voltage detector included in the voltage generator according to the first embodiment. FIG. 2 illustrates a top view of the voltage detector 7, as a cross-sectional configuration of the voltage generator 101 when the voltage generator 101 is cut along line II-II illustrated in FIG. 1.

In the first embodiment, a case will be described in which a line connecting an axis 20A, which is an axis of the support column 2A, and an axis 20B, which is an axis of the support column 2B, is parallel to the X-axis direction, that is, a case will be described in which a line connecting the axes 20A and 20B in the XY plane is parallel to the X-axis direction.

The voltage detector 7 of the first embodiment includes a first rectangular area 71 and a second rectangular area 72 when viewed from above. The first rectangular area 71 includes a side extending in the X-axis direction and a side extending in the Y-axis direction. The second rectangular area 72 includes a side extending in the X-axis direction and a side extending in the Y-axis direction. A width of the second rectangular area 72 in the Y-axis direction is shorter than a width of the first rectangular area 71 in the Y-axis direction.

In the first embodiment, a case where a high voltage of 80 kV at maximum is applied to the voltage detector 7 will be described. When the high voltage of 80 kV at maximum is applied, the voltage detector 7 reduces the voltage at a voltage division ratio of an internal circuit and detects the voltage. In the voltage generator 101, feedback control is executed on the basis of the detected voltage.

In FIG. 2, a portion to which a highest voltage is applied on the voltage detector 7 is indicated by a high-voltage portion 7A, and a portion to which a lowest voltage is applied on the voltage detector 7 is indicated by a low-voltage portion 7B. The high-voltage portion 7A on a high potential side in the voltage detector 7 is disposed at a position away from the support columns 2A and 2B connected to the ground potential of the sealed case 1. In addition, the low-voltage portion 7B on a low potential side in the voltage detector 7 has an equal potential to the support columns 2A and 2B, and thus is arranged at a position close to the support columns 2A and 2B.

In the first embodiment, the voltage detector 7 is configured such that the high-voltage portion 7A and the low-voltage portion 7B are generated in the first rectangular area 71. Further, in the voltage detector 7, a width of the first rectangular area 71 in the Y-axis direction, a width of the second rectangular area 72 in the Y-axis direction, and a position of the high-voltage portion 7A are adjusted such that a creepage path from the high-voltage portion 7A to the support column 2A does not become a linear path. That is, the width of the first rectangular area 71 in the Y-axis direction, the width of the second rectangular area 72 in the Y-axis direction, and the position of the high-voltage portion 7A are adjusted such that the creepage path from the high-voltage portion 7A to the support column 2A is an L-shaped bent path in the voltage detector 7. As a result, a space, that is, an insulating layer exists on a straight line from the high-voltage portion 7A to the support column 2A.

The creepage path from the high-voltage portion 7A to the support column 2A is bent at a boundary position between the first rectangular area 71 and the second rectangular area 72, which makes the creepage path from the high-voltage portion 7A to the support column 2A to be an L-shaped path. Specifically, the creepage path of the first embodiment is a path bent at a boundary position between the first rectangular area 71 and the second rectangular area 72, passing through the second rectangular area 72, and reaching the support column 2A which is a ground point. Note that a bending angle of the creepage path from the high-voltage portion 7A to the support column 2A is not limited to 90 degrees, and may be less than 90 degrees.

For example, the high-voltage portion 7A is provided on the voltage detector 7 at a position close to a center C1 of the axes 20A and 20B such that a creepage distance from the high-voltage portion 7A to the support column 2A is equal to a creepage distance from the high-voltage portion 7A to the support column 2B. That is, the high-voltage portion 7A is disposed such that the creepage distance between the high-voltage portion 7A and the support column 2A is substantially equal to the creepage distance between the high-voltage portion 7A and the support column 2B. In the first embodiment, since the creepage path from the high-voltage portion 7A to the support column 2A is an L-shaped path, a linear distance from the high-voltage portion 7A to the support column 2A can be made shorter than a linear distance from the high-voltage portion 7A to the support column 2B. Accordingly, in the voltage detector 7, creeping discharge can be suppressed.

In the high-voltage portion 7A, when discharge occurs to the support columns 2A and 2B having the lowest voltage, a circuit of the voltage detector 7 may be destroyed. In the voltage detector 7, since the creepage path from the high-voltage portion 7A to the support column 2A is an L-shaped path, it is possible to lengthen the creepage path from the high-voltage portion 7A to the support column 2A and the creepage path from the high-voltage portion 7A to the support column 2B. That is, in the voltage detector 7, a sufficient space distance and a sufficient creepage distance can be secured between the high-voltage portion 7A and the support columns 2A and 2B.

Here, a voltage detector of a comparative example will be considered. In the voltage detector of the comparative example, a width of the first rectangular area in the Y-axis direction is equal to a width of the second rectangular area in the Y-axis direction. That is, the voltage detector of the comparative example includes one rectangular area in which the first rectangular area and the second rectangular area are combined. Further, in the voltage detector of the comparative example, an inside of the sealed case is not filled with an insulating layer having higher insulation performance than air.

When there is only one rectangular area as in the voltage detector of the comparative example, a creepage path from the high-voltage portion to the support column becomes a straight line, and a strongest electric field is generated in a linear direction from the high-voltage portion toward the support column. In this way, in the voltage detector of the comparative example, paths of spatial discharge and creeping discharge are identical. Therefore, in the voltage detector of the comparative example, an effect of discharge suppression has been small even in a case where an inside of the sealed case has been filled with an insulating layer such as an insulating gas having higher insulation performance than air. That is, the voltage detector of the comparative example has had a high possibility of discharge on a creepage surface.

Whereas, in the voltage generator 101 of the first embodiment, the width of the second rectangular area 72 in the Y-axis direction is narrowed smaller than the width of the first rectangular area 71 in the Y-axis direction, so that the creepage path from the high-voltage portion 7A to the support column 2A is made as an L-shaped path. Further, in the voltage generator 101 of the first embodiment, an insulating layer of gas, oil, resin, or the like is filled and stored inside the sealed case 1, so that the insulation performance in a linear path from the high-voltage portion 7A to the support column 2A is higher than that of air. With such a configuration, in the voltage generator 101, a linear spatial discharge path and an L-shaped creeping discharge path are distinguished.

Therefore, between the voltage detector 7 of the voltage generator 101 and the voltage detector of the comparative example, a dielectric strength, which is the insulation performance, of the voltage detector 7 of the voltage generator 101 is improved by the effect of the insulating layer, even if there is no difference in distance of the linear spatial discharge. That is, in the voltage detector 7 of the voltage generator 101, a path of the spatial discharge includes a path in which the voltage detector 7 is not present, and an inside of the sealed case 1 is filled with the insulating layer, so that discharge does not occur on the creepage surface.

In a case where an inside of the sealed case 1 is filled with the insulating layer, the discharge suppression effect is about three times as large as that in a case where an inside of the sealed case 1 is filled with air. For example, under the condition that a distance between certain two points does not change, discharge occurs at 20 kV in the air, whereas discharge does not occur up to 60 kV in the insulating gas. Note that the effect of the insulating layer is limited to spatial discharge, and the suppression effect is not obtained in creeping discharge as much as spatial discharge.

In the voltage detector 7, the L-shaped discharge path is a path from the high-voltage portion 7A to the support column 2A via a path in the Y-axis direction and a path in the X-axis direction. That is, in the voltage detector 7, an electric field decomposed into individual components in the X-axis direction and the Y-axis direction is smaller than an electric field in the linear direction connecting the high-voltage portion 7A and the support column 2A, so that discharge can be suppressed. Further, in the voltage generator 101 of the first embodiment, a linear spatial discharge path and a creeping discharge path which is a bent path are distinguished from each other. Therefore, the dielectric strength of the voltage detector 7 of the voltage generator 101 is improved by the effect of the insulating layer. In this way, in the voltage generator 101, since the creepage path from the high-voltage portion 7A to the support column 2A is an L-shaped path, high insulation performance can be secured for the support column 2A.

Since the voltage detector 7 can ensure high insulation performance for the support column 2A, the support column 2A and the support column 2B can be connected at a short distance. In a case where a distance between the support columns 2A and 2B is equal to a distance between the support columns in the voltage detector of the comparative example, a withstand voltage of the voltage detector 7 can be made about 1.5 times as large as that of the voltage detector of the comparative example. In other words, in a case where the voltage detector 7 achieves a withstand voltage equivalent to that of the voltage detector of the comparative example, the distance between the support columns 2A and 2B can be made shorter than that of the comparative example. In this way, the voltage generator 101 can prevent discharge between the high-voltage portion 7A and the potential of the sealed case 1. In addition, since it is possible to achieve downsizing and weight reduction of the voltage generator 101, it is possible to realize an attachment structure that is strong in vibration resistance. Therefore, even if the number of stacked booster circuitries increases, it is possible to realize the voltage generator 101 that is downsized and strong in vibration resistance.

Note that the booster circuitries 61 to 63 may have a top surface shape similar to that of the voltage detector 7. That is, the booster circuitries 61 to 63 may include rectangular areas similar to the first rectangular area 71 and the second rectangular area 72. Also in this case, an L-shaped bent path is included in a creepage path from a high-voltage portion, which is a portion to which a highest voltage is applied in the booster circuitries 61 to 63, to the support column 2A. The high-voltage portion on the voltage detector 7 is a first high-voltage portion, and the high-voltage portion on the booster circuitries 61 to 63 is a second high-voltage portion.

In addition, the booster circuitries 61 to 63 may be fixed to the support columns 2A and 2B for all the circuit blocks that can be included in the booster circuitries 61 to 63, or may be fixed by thinning out, for example, one for two to three blocks. In addition, the voltage detector 7 and the booster circuitries 61 to 63 are not limited to being fixed to the support columns 2A and 2B, and may be fixed to an inner wall surface of the sealed case 1.

As described above, in the first embodiment, the bent path is included in the creepage path from the high-voltage portion 7A to the support column 2A, which is the ground point at an equal potential to the sealed case 1. As a result, the creepage path from the high-voltage portion 7A to the support column 2A is longer than that in a case where the creepage path is only a straight line, so that the distance between the support columns 2A and 2B can be shortened. Therefore, the voltage generator 101 can be downsized while securing high insulation performance.

In addition, since a discharge path, which is the creepage path from the high-voltage portion 7A to the support column 2A, has been changed from a straight line to an L-shaped path, the creepage path is a path with a small electric field in electric field distribution between the high-voltage portion 7A and the support column 2A. This can suppress discharge to the support columns 2A and 2B, and insulation performance is improved.

Second Embodiment

Next, a second embodiment will be described with reference to FIG. 3. In the second embodiment, a creepage path from a high-voltage portion to the support column 2A connected to a ground potential is a path bent a plurality of times.

Figure 3:
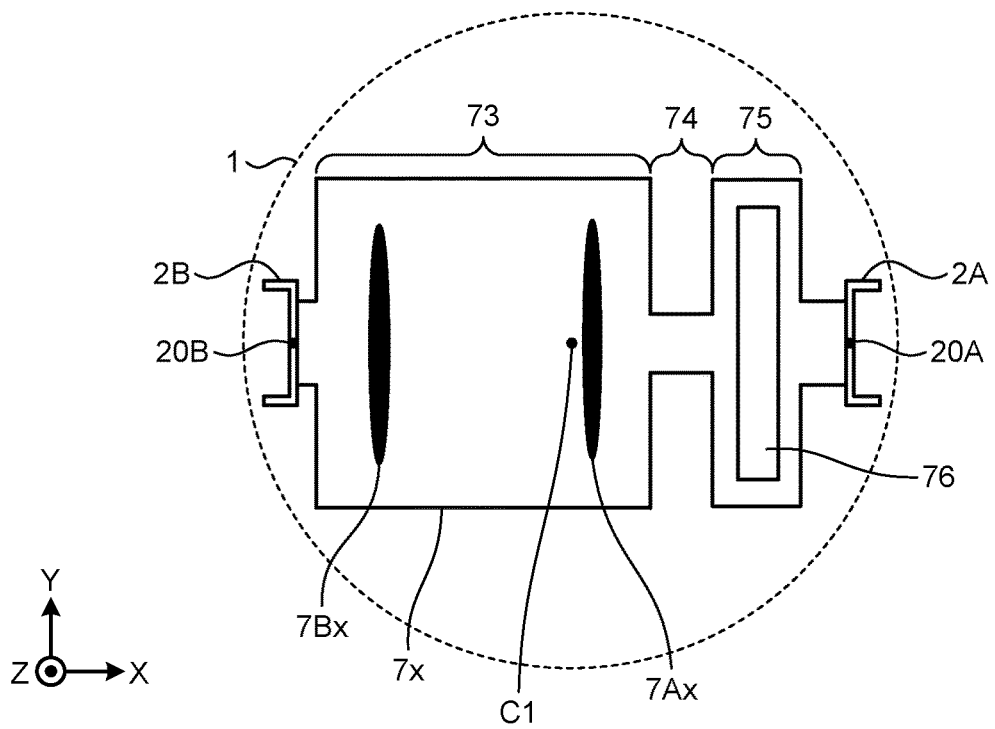
FIG. 3 is a view illustrating a configuration of a voltage detector included in a voltage generator according to a second embodiment.

FIG. 3 is a view illustrating a configuration of a voltage detector included in a voltage generator according to the second embodiment. FIG. 3 illustrates a top view of a voltage detector 7x, as a cross-sectional configuration of the voltage generator 101 when the voltage generator 101 is cut along line II-II illustrated in FIG. 1.

Among the individual components in FIG. 3, components that achieve functions identical to those of the voltage detector 7 of the first embodiment illustrated in FIG. 2 are denoted by the identical reference numerals, and redundant descriptions will be omitted. The voltage generator 101 of the second embodiment includes the voltage detector 7x instead of the voltage detector 7 as compared with the voltage generator 101 of the first embodiment, and the other configurations are identical.

Also in the second embodiment, similarly to the first embodiment, a description will be given to a case where a line connecting the axis 20A, which is an axis of the support column 2A, and the axis 20B, which is an axis of the support column 2B, is parallel to the X-axis direction.

The voltage detector 7x of the second embodiment includes a first rectangular area 73, a second rectangular area 74, and a rectangular ring area 75 when viewed from above. The first rectangular area 73 is an area similar to the first rectangular area 71, and includes a side extending in the X-axis direction and a side extending in the Y-axis direction. The second rectangular area 74 includes a side extending in the X-axis direction and a side extending in the Y-axis direction. A width of the second rectangular area 74 in the Y-axis direction is shorter than a width of the first rectangular area 73 in the Y-axis direction.

In the rectangular ring area 75, a central area 76 is hollowed out in a rectangular shape, so that a rectangular shape with a rectangular opening is formed. A width of an outer peripheral portion of the rectangular ring area 75 in the Y-axis direction is equal to a width of the first rectangular area 73 in the Y-axis direction.

In FIG. 3, a portion to which a highest voltage is applied on the voltage detector 7x is indicated by a high-voltage portion 7Ax, and a portion to which a lowest voltage is applied on the voltage detector 7x is indicated by a low-voltage portion 7Bx. The high-voltage portion 7Ax on a high potential side in the voltage detector 7x is disposed at a position away from the support columns 2A and 2B connected to the ground potential of the sealed case 1. In addition, the low-voltage portion 7Bx on a low potential side in the voltage detector 7x has an equal potential to the support columns 2A and 2B, and thus is arranged at a position close to the support columns 2A and 2B.

In the second embodiment, the voltage detector 7x is configured such that the high-voltage portion 7Ax and the low-voltage portion 7Bx are generated in the first rectangular area 73. In addition, in the voltage detector 7x, a width of the first rectangular area 73 in the Y-axis direction, a width of the second rectangular area 74 in the Y-axis direction, a dimension of the rectangular ring area 75, and a position of the high-voltage portion 7Ax are adjusted such that a creepage distance from the high-voltage portion 7Ax to the support column 2A does not become a linear distance. Specifically, the width of the first rectangular area 73 in the Y-axis direction, the width of the second rectangular area 74 in the Y-axis direction, the dimension of the rectangular ring area 75, and the position of the high-voltage portion 7Ax are adjusted such that a creepage path from the high-voltage portion 7Ax to the support column 2A includes a bent path that is bent in an shape or a U shape in the XY plane in the voltage detector 7x. As a result, an insulating layer exists on a straight line from the high-voltage portion 7Ax to the support column 2A.

For example, the high-voltage portion 7Ax is provided on the voltage detector 7x at a position close to the center C1 of the axes 20A and 20B such that a creepage distance from the high-voltage portion 7Ax to the support column 2A is equal to a creepage distance from the high-voltage portion 7Ax to the support column 2B. That is, the high-voltage portion 7Ax is disposed such that the creepage distance between the high-voltage portion 7Ax and the support column 2A is substantially equal the creepage distance between the high-voltage portion 7Ax and the support column 2B.

The high-voltage portion 7Ax may spread over a wide range instead of a partial narrow area. In this case, in a structure of the voltage detector 7 as in the first embodiment, the creepage path from the high-voltage portion 7Ax to the support column 2A becomes a straight line.

Whereas, in the voltage generator 101 of the second embodiment, the high-voltage portion 7Ax includes the rectangular ring area 75 having a rectangular shape with a rectangular opening, and the creepage path from the high-voltage portion 7Ax to the support column 2A is a bent path passing through the rectangular ring area 75. Specifically, the creepage path of the second embodiment is a path passing from the first rectangular area 73 to the second rectangular area 74, bent at a boundary position between the second rectangular area 74 and the rectangular ring area 75, bent in the rectangular ring area 75, and reaching the support column 2A which is a ground point. That is, the creepage path from the high-voltage portion 7Ax to the support column 2A is a bent path bent at a plurality of places, such as the boundary position between the second rectangular area 74 and the rectangular ring area 75 and the inside of the rectangular ring area 75. Therefore, a linear distance from the high-voltage portion 7Ax to the support column 2A can be made shorter than a linear distance from the high-voltage portion 7Ax to the support column 2B.

In the voltage detector 7x of the second embodiment, the discharge path in the rectangular shape with a rectangular opening is a path from the high-voltage portion 7Ax to the support column 2A via a path in the Y-axis direction, a path in the X-axis direction, a path in the Y-axis direction, a path in the X-axis direction, a path in the Y-axis direction, and a path in the X-axis direction. That is, in the voltage detector 7x, an electric field decomposed into individual components in the X-axis direction and the Y-axis direction is smaller than an electric field in the linear direction connecting the high-voltage portion 7Ax and the support column 2A, so that discharge can be suppressed.

With such a configuration, in the voltage generator 101 according to the second embodiment, a linear path of spatial discharge and a bent path passing through the rectangular ring area 75 are distinguished. Therefore, a dielectric strength of the voltage detector 7x of the voltage generator 101 is improved by the effect of the insulating layer, similarly to the case of the first embodiment.

In a case of the rectangular shape with a rectangular opening as in the rectangular ring area 75, an electric field in the Y-axis direction perpendicular to the electric field direction between the high-voltage portion 7Ax and the support column 2A is particularly small. In addition, in a case where a distance between the support columns 2A and 2B is equal to a distance between the support columns in the voltage detector of the comparative example, a withstand voltage of the voltage detector 7x can be made about 1.5 times as large as that of the voltage detector of the comparative example. In this way, the voltage generator 101 of the second embodiment can prevent discharge between the high-voltage portion 7Ax and the potential of the sealed case 1. In addition, since it is possible to achieve downsizing and weight reduction of the voltage generator 101, it is possible to realize an attachment structure strong in vibration resistance.

Further, similarly to the first embodiment, a discharge path, which is a creepage path from the high-voltage portion 7Ax to the support column 2A, has been changed from a linear path to a path including the path in a rectangular shape with a rectangular opening, the creepage path is a path with a small electric field in electric field distribution between the high-voltage portion 7Ax and the support column 2A. This can suppress discharge to the support columns 2A and 2B, and insulation performance is improved.

Note that the booster circuitries 61 to 63 may have a top surface shape similar to that of the voltage detector 7x. That is, the booster circuitries 61 to 63 may include rectangular areas similar to the first rectangular area 73 and the second rectangular area 74, and a rectangular ring area similar to the rectangular ring area 75.

As described above, in the second embodiment, since the bent path is included in the creepage path from the high-voltage portion 7Ax to the support column 2A, which is the ground point at an equal potential to the sealed case 1, the voltage generator 101 can be downsized while securing high insulation performance, similarly to the first embodiment.

Third Embodiment

Next, a third embodiment will be described with reference to FIGS. 4 and 5. In the third embodiment, a spacer and a baseplate which is a base are provided on a bottom part of the voltage detector 7y. As a result, a creepage path from the voltage detector 7y to the support column 2A is to be a bent path using the spacer and the baseplate.

Figure 4:
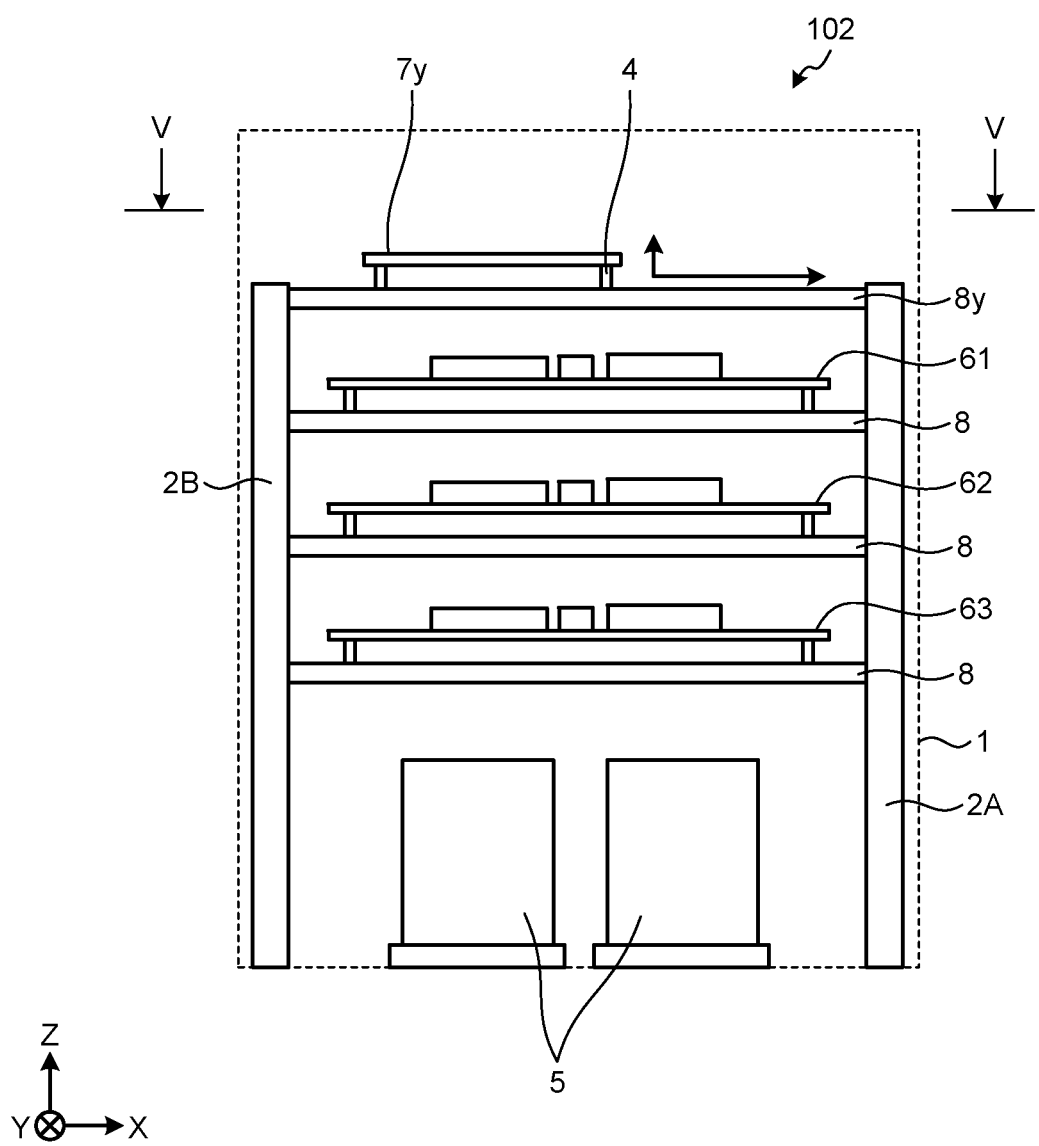
FIG. 4 is a view illustrating a configuration of a voltage generator according to a third embodiment.

FIG. 4 is a view illustrating a configuration of a voltage generator according to the third embodiment. FIG. 4 illustrates a mounting structure of an insulating substrate included in a voltage generator 102. FIG. 4 illustrates a cross-sectional view of the cylindrical sealed case 1 in which a disk-shaped insulating substrate is disposed, when the sealed case 1 is cut along a plane including a cylinder axis. Among the individual components in FIG. 4, components that achieve functions identical to those of the voltage generator 101 of the first embodiment illustrated in FIG. 1 are denoted by the identical reference numerals, and redundant descriptions will be omitted.

The voltage generator 102 includes: baseplates 8 and 8y; and a spacer 4, in addition to the components included in the voltage generator 101. In addition, the voltage generator 102 includes a voltage detector 7y instead of the voltage detector 7 as compared with the voltage generator 101.

The baseplate 8 is a disk-shaped plate on which the booster circuitries 61 to 63 are placed, and the baseplate 8y is a disk-shaped plate on which the voltage detector 7y is placed. The baseplates 8 and 8y are arranged in a direction parallel to the XY plane. One unit is placed on one baseplate. That is, the voltage generator 102 includes three baseplates 8 on which the booster circuitries 61 to 63 are placed and one baseplate 8y on which the voltage detector 7y is placed. The baseplates 8 and 8y are made by an insulating material. The spacer 4 extends in the Z-axis direction from top surfaces of the baseplates 8 and 8y. For example, the spacer 4 on the baseplate 8y extends from a top surface of the baseplate 8y toward a bottom surface of the voltage detector 7y. In this way, the spacer 4 is disposed at a specific position between the baseplate 8y and the voltage detector 7y such that the voltage detector 7y and the baseplate 8y are disposed apart from each other by a specific interval.

The individual baseplates 8 and 8y are fixed to the support columns 2A and 2B with screws or the like. The booster circuitries 61 to 63 are mounted in parallel to the baseplate 8 via a plurality of insulating-type spacers 4 erected on the baseplate 8. In addition, the voltage detector 7y is attached in parallel to the baseplate 8y via a plurality of insulating-type spacers 4 erected on the baseplate 8y.

A creepage path from the voltage detector 7y to the support column 2A passes through the spacer 4 extending in the Z-axis direction and the baseplate 8y parallel to the XY plane. Therefore, the creepage path from the voltage detector 7y to the support column 2A is an L-shaped path when viewed from the Y-axis direction. Specifically, the creepage path of the third embodiment is a path passing from a high-voltage portion 7Ay to the spacer 4, bent at a boundary position between the spacer 4 and the baseplate 8y, passing through the baseplate 8y, and reaching the support column 2A which is a ground point.

Figure 5:
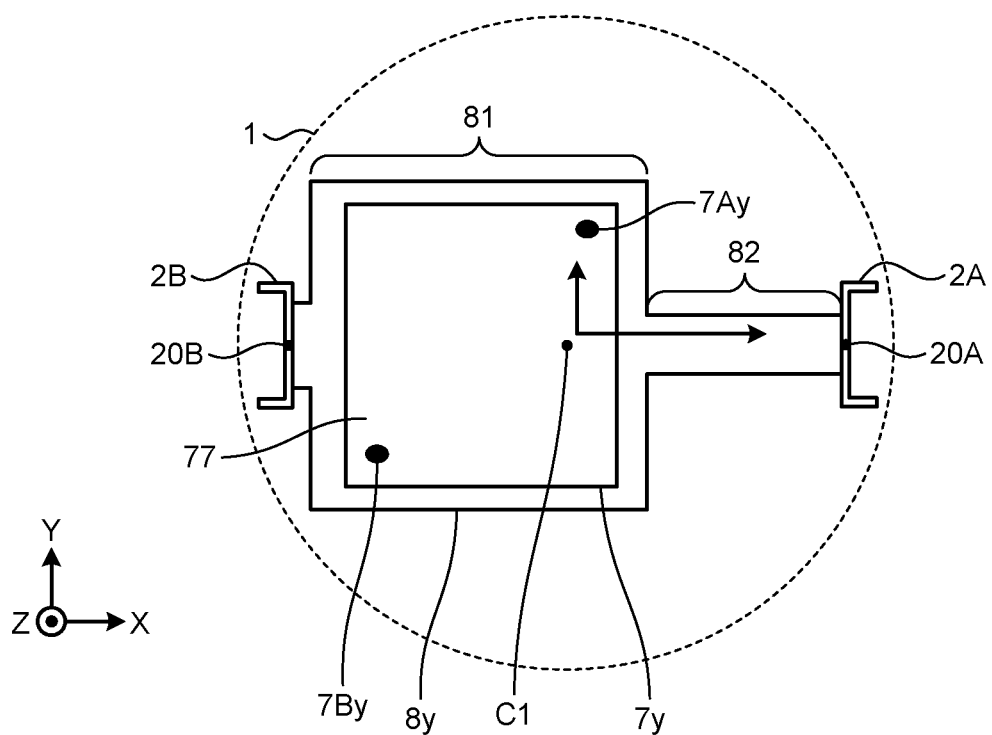
FIG. 5 is a view illustrating a configuration of a voltage detector included in the voltage generator according to the third embodiment.

FIG. 5 is a view illustrating a configuration of a voltage detector included in a voltage generator according to the third embodiment. FIG. 5 illustrates a top view of the voltage detector 7y, as a cross-sectional configuration of the voltage generator 102 when the voltage generator 102 is cut along line V-V illustrated in FIG. 4.

Among the individual components in FIG. 5, components that achieve functions identical to those of the voltage detector 7 of the first embodiment illustrated in FIG. 2 are denoted by the identical reference numerals, and redundant descriptions will be omitted. Also in the third embodiment, similarly to the first embodiment, a description will be given to a case where a line connecting the axis 20A, which is an axis of the support column 2A, and the axis 20B, which is an axis of the support column 2B, is parallel to the X-axis direction.

The voltage detector 7y of the third embodiment includes a third rectangular area 77 when viewed from above. The baseplate 8y includes a first rectangular area 81 and a second rectangular area 82 when viewed from above. The first rectangular area 81 includes a side extending in the X-axis direction and a side extending in the Y-axis direction. The second rectangular area 82 includes a side extending in the X-axis direction and a side extending in the Y-axis direction. A width of the second rectangular area 82 in the Y-axis direction is narrower than a width of the first rectangular area 81 in the Y-axis direction.

In FIG. 5, a portion to which a highest voltage is applied on the voltage detector 7y is indicated by the high-voltage portion 7Ay, and a portion to which a lowest voltage is applied on the voltage detector 7y is indicated by a low-voltage portion 7By. The high-voltage portion 7Ay in the voltage detector 7y is disposed at a position away from the support columns 2A and 2B connected to the ground potential of the sealed case 1. In addition, the low-voltage portion 7By on a low potential side in the voltage detector 7y has an equal potential to the support columns 2A and 2B, and thus is arranged at a position close to the support columns 2A and 2B.

In the third embodiment, the voltage detector 7y is configured such that the high-voltage portion 7Ay and the low-voltage portion 7By are generated in the third rectangular area 77. Further, in the voltage detector 7y, a dimension of the spacer 4, an arrangement position of the spacer 4, and a dimension of the baseplate 8y are adjusted such that a creepage distance from the high-voltage portion 7Ay to the support column 2A does not become a linear distance. That is, the voltage detector 7y is formed such that the creepage path from the high-voltage portion 7Ay to the support column 2A passes through the spacer 4, the first rectangular area 81, and the second rectangular area 82 in the voltage detector 7y. As a result, an insulating layer exists on a straight line from the high-voltage portion 7Ay to the support column 2A.

Here, as an arrangement example of the spacer 4, a case will be described in which the spacer 4 is arranged below the high-voltage portion 7A described in the first embodiment. In this case, a creepage path in the XY plane from a bottom part of the spacer 4 to the support column 2A becomes the L-shaped creepage path described in the first embodiment. Note that the spacer 4 may be disposed at any position as long as the creepage path from a bottom surface of the spacer 4 to the support column 2A can be formed in an L shape.

In this way, since the voltage detector 7y is connected to the support column 2A via the spacer 4 extending in the Z-axis direction and the baseplate 8y parallel to the XY plane, the creepage path from the high-voltage portion 7Ay to the support column 2A includes an L-shaped bent path viewed from the Y-axis direction. Further, a width of the second rectangular area 82 in the Y-axis direction is shorter than a width of the first rectangular area 81 in the Y-axis direction, and the creepage path from the high-voltage portion 7Ay to the support column 2A includes an L-shaped path as viewed in the Z-axis direction. Therefore, a linear distance from the high-voltage portion 7Ay to the support column 2A may be made shorter than a linear distance from the high-voltage portion 7Ay to the support column 2B. For this reason, the linear distance from the high-voltage portion 7Ay to the support column 2B can be made longer than the linear distance from the high-voltage portion 7Ay to the support column 2A.

In this way, in the voltage detector 7y, the L-shaped discharge path is a path from the high-voltage portion 7Ay to the support column 2A via a path in the Y-axis direction and a path in the X-axis direction. That is, in the voltage detector 7y, an electric field decomposed into individual components in the X-axis direction and the Y-axis direction is smaller than an electric field in the linear direction connecting the high-voltage portion 7Ay and the support column 2A, so that discharge can be suppressed. Further, in the voltage generator 102 of the third embodiment, a linear spatial discharge path and a creeping discharge path which is a bent path are distinguished from each other. Therefore, a dielectric strength of the voltage detector 7y of the voltage generator 102 is improved by the effect of the insulating layer, similarly to the case of the first embodiment.

In addition, since the voltage detector 7y is connected to the support column 2B via the spacer 4 extending in the Z-axis direction and the baseplate 8y parallel to the XY plane, the creepage path from the high-voltage portion 7Ay to the support column 2B also includes an L-shaped path as viewed from the Y-axis direction. Therefore, a linear distance from the high-voltage portion 7Ay to the support column 2B can be made shorter than a linear distance from the high-voltage portion 7A to the support column 2B described in the first embodiment.

In addition, in a case where a distance between the support columns 2A and 2B is equal to a distance between the support columns in the voltage detector of the comparative example, a withstand voltage of the voltage detector 7y can be made about 1.5 times as large as that of the voltage detector of the comparative example. In this way, the voltage generator 102 of the third embodiment can prevent discharge between the high-voltage portion 7Ay and the potential of the sealed case 1. In addition, since it is possible to achieve downsizing and weight reduction of the voltage generator 102, it is possible to realize an attachment structure strong in vibration resistance.

Note that the baseplate 8 may have a top surface shape similar to that of the baseplate 8y. That is, the baseplate 8 may include two rectangular areas similar to the first rectangular area 81 and the second rectangular area 82. Further, the booster circuitries 61 to 63 may have a top surface shape similar to that of the voltage detector 7y. That is, the booster circuitries 61 to 63 may include a rectangular area similar to the third rectangular area 77.

Further, a width of the first rectangular area 81 in the Y-axis direction and a width of the second rectangular area 82 in the Y-axis direction may be equal widths. In addition, a shape of the second rectangular area 82 may include a rectangular ring shape. That is, the third embodiment may be applied to the second embodiment. In this case, for example, the shape of the second rectangular area 82 is a shape including the second rectangular area 74 and the rectangular ring area 75 described in the second embodiment.

Note that a bent path passing through the voltage detectors 7 and 7x as viewed from the Z-axis direction is a first bent path in the first and second embodiments, while a bent path passing through the spacer 4 as viewed from the Y-axis direction is a first bent path, and a bent path passing through the baseplate 8y as viewed from the Z-axis direction is a second bent path in the third embodiment. Further, a bent path passing through the booster circuitries 61 to 63 as viewed from the Z-axis direction is a third bent path. A creepage path including the first bent path or the second bent path is a first creepage path, and a creepage path including the third bent path is a second creepage path.

As described above, in the third embodiment, since a bent path is included in the creepage path from the high-voltage portion 7Ay to the support column 2A, which is a ground point at an equal potential to the sealed case 1, the voltage generator 102 can be downsized while securing high insulation performance, similarly to the first embodiment.

Fourth Embodiment

Next, a fourth embodiment will be described with reference to FIGS. 6 to 14. In the first to third embodiments, discharge is suppressed by securing the creepage distance by the structures of the voltage detectors 7, 7x, and 7y, but the discharge suppression may be insufficient only by securing the creepage distance by the structure. Therefore, in the fourth embodiment, electric fields of the high-voltage portions 7A, 7Ax, and 7Ay are relaxed in addition to the configurations of the first to third embodiments.

Hereinafter, a specific configuration of the voltage detector 7 will be described, and an electric field relaxation method of the high-voltage portion 7A included in the voltage detector 7 will be described. Note that the electric field relaxation method of the fourth embodiment can also be applied to the voltage detectors 7x and 7y similarly to the voltage detector 7.

Figure 6:
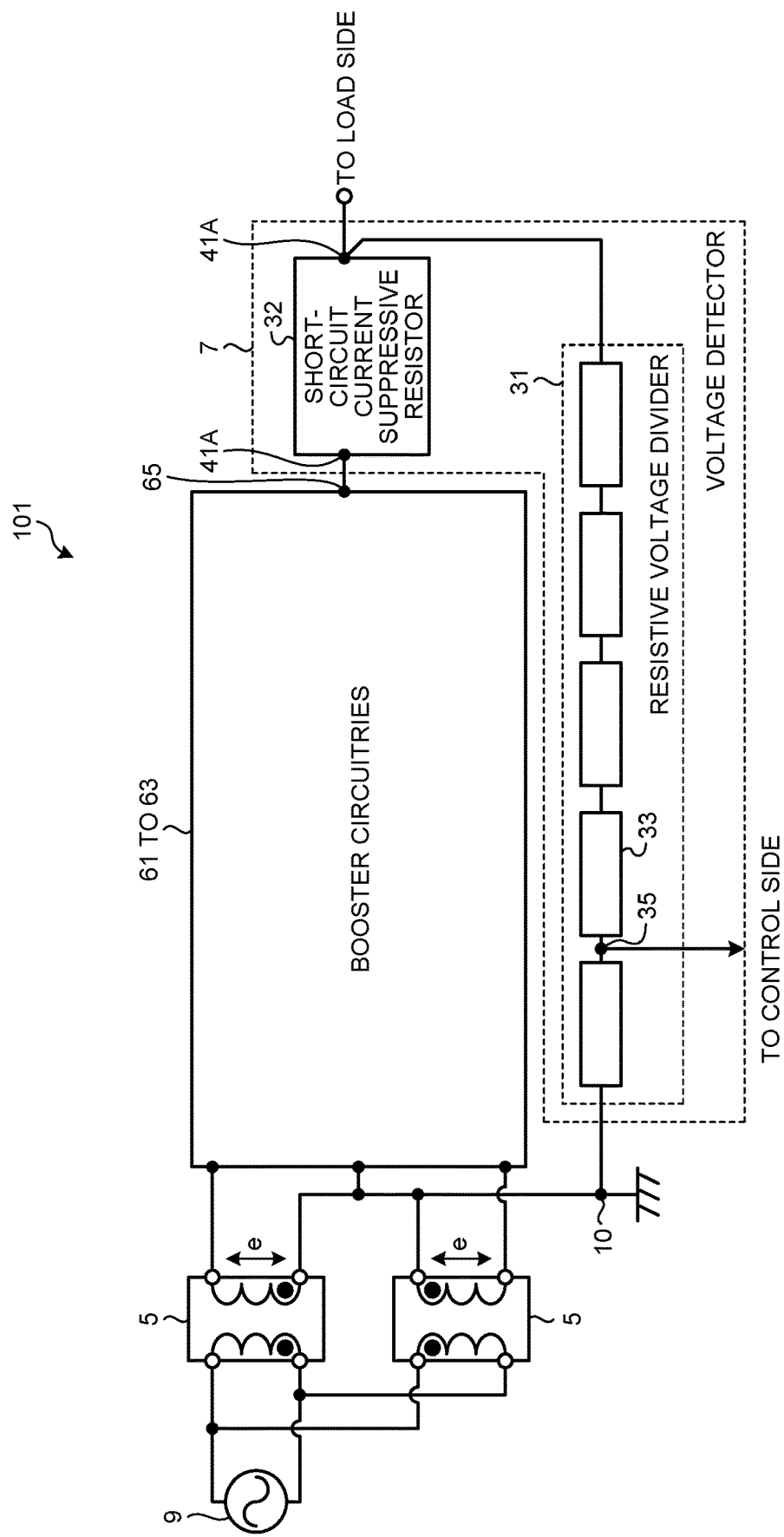
FIG. 6 is a diagram illustrating a circuit configuration of a voltage generator according to a fourth embodiment.

FIG. 6 is a diagram illustrating a circuit configuration of a voltage generator according to the fourth embodiment. The voltage generator 101 includes: the booster circuitries 61 to 63; the voltage detector 7; two high-voltage transformers 5; and a power supply device 9. The power supply device 9 generates an AC voltage and inputs the voltage to the high-voltage transformer 5. The power supply device 9 is configured using an inverter circuit or the like. In addition, the voltage generator 101 includes a connection point 10 connected to an input terminal of the booster circuitry 63, the voltage detector 7, and the ground potential.

The voltage detector 7 includes: a short-circuit current suppressive resistor 32; a resistive voltage divider 31 in which a plurality of voltage-dividing resistors 33 are connected in series; a connection point 35; and two connection fittings 41A. The short-circuit current suppressive resistor 32 is a resistor that suppresses a short-circuit current to prevent a failure of the booster circuitries 61 to 63. A load (for example, an X-ray, an electron beam, or the like) connected to the power supply device 9 which is a high-voltage power supply frequently becomes in a short-circuit mode (an output of the booster circuitries 61 to 63 is short-circuited to the ground). Even if the load side is short-circuited, the short-circuit current is suppressed by the short-circuit current suppressive resistor 32 in the voltage detector 7. For example, when the output voltage is −50 kV and the short-circuit current suppressive resistor 32 is 1 kΩ, the short-circuit current suppressive resistor 32 suppresses the short-circuit current to 50 A. One end of the resistive voltage divider 31 is connected to the connection point 10. Further, another end of the resistive voltage divider 31 is connected to the short-circuit current suppressive resistor 32 via one of the connection fittings 41A. That is, among the voltage-dividing resistors 33 included in the resistive voltage divider 31, the voltage-dividing resistor 33 disposed at one end is connected to the connection point 10, while the voltage-dividing resistor 33 disposed at another end is connected to the short-circuit current suppressive resistor 32 via one of the connection fittings 41A. The voltage-dividing resistor 33 disposed at one end and connected to the connection point 10 is connected to the voltage-dividing resistor 33 at the subsequent stage via the connection point 35, and the connection point 35 is connected to a control side.

One of the connection fittings 41A is connected to the load side. In addition, the short-circuit current suppressive resistor 32 is connected to another one of the connection fittings 41A and an output terminal 65 of the booster circuitry 61.

An output voltage from the booster circuitry 61 is sent to one of the connection fittings 41A via another one of the connection fittings 41A and the short-circuit current suppressive resistor 32 in the voltage detector 7. This output voltage is separated into the load side and the resistive voltage divider 31 in the voltage detector 7, in the one of the connection fittings 41A. The resistive voltage divider 31 divides the output voltage at the connection point 35 and extracts a low voltage for control.

The short-circuit current suppressive resistor 32 is a resistor that suppresses a short-circuit current. The short-circuit current suppressive resistor 32 tends to be large because a tolerance that causes no problem even when a high voltage is applied and a short-circuit current flows is required. Here, as an example, a case where the short-circuit current suppressive resistor 32 is an EREMA (Registered trade mark) (silicon carbide) resistor will be described, but a type, a shape, and the number of resistors are not limited. Note that, positions of both ends of the short-circuit current suppressive resistor 32 connected to the output voltage are positions at which the voltage becomes maximum in the voltage generator 101.

Figure 7:
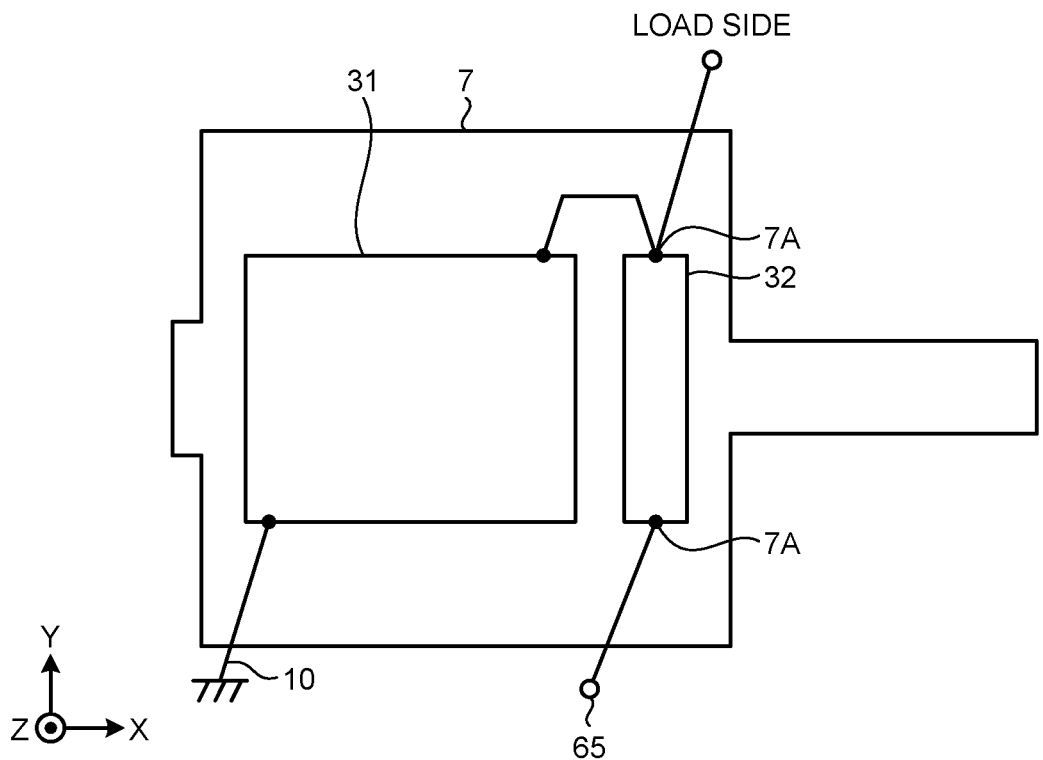
FIG. 7 is a view for explaining a configuration of a voltage detector included in the voltage generator according to the fourth embodiment.

FIG. 7 is a view for explaining a configuration of a voltage detector included in a voltage generator according to the fourth embodiment. Note that, in FIG. 7, the connection fitting 41A is not illustrated. In the voltage detector 7, the resistive voltage divider 31 and the short-circuit current suppressive resistor 32 are arranged. The resistive voltage divider 31 is connected to the connection point 10 connected to the ground potential. In addition, the resistive voltage divider 31 is connected to the short-circuit current suppressive resistor 32 via the connection fitting 41A (not illustrated in FIG. 7). The short-circuit current suppressive resistor 32 is connected to the output terminal 65 of the booster circuitry 61 via the connection fitting 41A connected to the load side.

In the voltage detector 7, since a total resistance value (for example, 60 MΩ) of the resistive voltage divider 31>>the short-circuit current suppressive resistor 32 (for example, 1 kΩ), both ends of the short-circuit current suppressive resistor 32 become the high-voltage portion 7A. For this reason, the short-circuit current suppressive resistor 32 is disposed at a position that can suppress discharge generated between the short-circuit current suppressive resistor 32 and the sealed case 1 having a ground potential. That is, as described with reference to FIG. 2 and the like, the short-circuit current suppressive resistor 32 is disposed at a position where the high-voltage portion 7A is located close to the center C1 of the axes 20A and 20B and discharge can be suppressed on the support column 2A side with respect to the center C1. As a result, the voltage detector 7 can suppress discharge on the support column 2A side with respect to the center C1. This is because, as described in the first to third embodiments, the creepage distance from the high-voltage portion 7A to the support column 2A is secured.

On the other hand, it may be difficult to suppress discharge only by securing the creepage distance described above. In this case, it is desirable to relax an electric field at both ends of the short-circuit current suppressive resistor 32. Note that a connection portion between the short-circuit current suppressive resistor 32 and the output terminal 65 of the booster circuitry 61 is likely to have an edge (likely to have an edge shape) and is likely to be a high electric field. In addition, the connection portion between the short-circuit current suppressive resistor 32 and the resistive voltage divider 31 is likely to have an edge and is likely to be a high electric field. In the short-circuit current suppressive resistor 32, since the connection portion with the output terminal 65 and the connection portion with the resistive voltage divider 31 are joined by solder, bolt, or the like, an acute angle is likely to be formed due to insufficient solder processing, a shape of an end surface of the bolt, and the like. For this reason, it is common to employ a rounded connection fitting for hiding the edge at the connection portion with the short-circuit current suppressive resistor 32. This allows the voltage detector 7 to prevent discharge.

An electric field strength at the connection fitting depends on a voltage applied to the high-voltage portion 7A, a distance from the high-voltage portion 7A, a shape of the connection fitting, and a size of the connection fitting. Therefore, when a distance cannot be secured due to downsizing, the connection fitting desirably has a shape as rounded as possible, and the electric field can be relaxed more as the size of the connection fitting is larger. For example, in a case where the connection fittings are spheres having different sizes, the electric field strength becomes lower as a size of the sphere is larger (as a diameter is longer).

Figure 8:
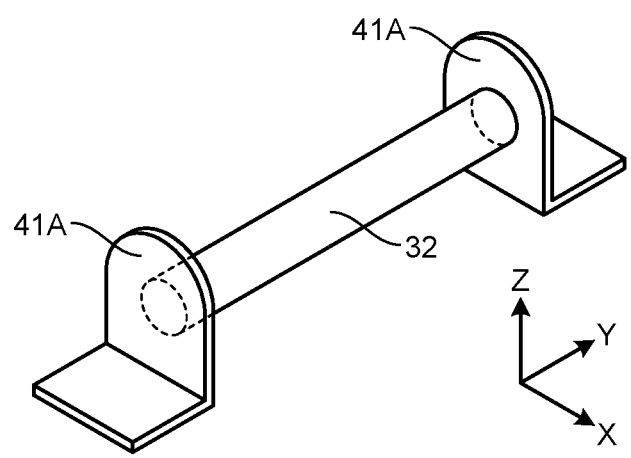
FIG. 8 is a view illustrating a connection configuration example of a short-circuit current suppressive resistor and a connection fitting included in the voltage generator according to the fourth embodiment.
Figure 9:
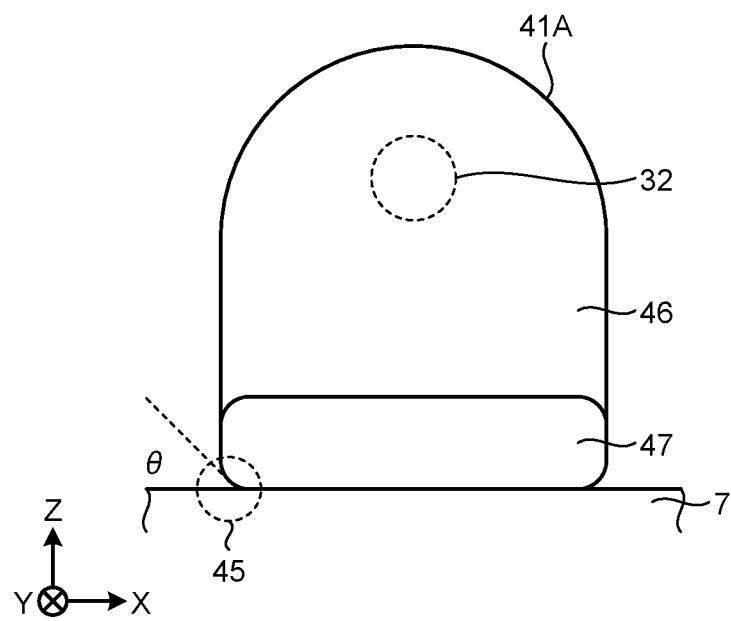
FIG. 9 is a view illustrating a first connection configuration example of the voltage detector and the connection fitting included in the voltage generator according to the fourth embodiment.

FIG. 8 is a view illustrating a connection configuration example of a short-circuit current suppressive resistor and a connection fitting included in the voltage generator according to the fourth embodiment. FIG. 9 is a view illustrating a first connection configuration example of the voltage detector and the connection fitting included in the voltage generator according to the fourth embodiment. FIG. 8 is a perspective view of the short-circuit current suppressive resistor 32 and the connection fitting 41A, and FIG. 9 is a front view of the voltage detector 7 and the connection fitting 41A.

A shape of the connection fitting 41A described here is an example. A type of the connection fitting 41A and a shape of whether or not the connection fitting 41A is rounded are not limited. As illustrated in FIG. 8, one connection fitting 41A is connected to one end of the rod-shaped short-circuit current suppressive resistor 32, and one connection fitting 41A is connected to another end.

The connection fitting 41A is, for example, a fitting having an L-shaped cross section formed by bending one end of a conductive thin plate member in upward (Z-axis direction). The connection fitting 41A includes a plate-shaped bottom surface 47 and a plate-shaped back surface part 46 bent upward. In the connection fitting 41A, the bottom surface 47 is attached to an insulating substrate or the like of the voltage detector 7, and the back surface part 46 extends in a direction perpendicular to the bottom surface 47. The insulating substrate is a substrate disposed at a position parallel to the XY plane, and the bottom surface 47 is attached to the insulating substrate so as to be parallel to the XY plane.

As described above, creeping discharge cannot be suppressed in some cases even when the creepage distance is secured and the shape of the connection fitting 41A is rounded. The reason why creeping discharge cannot be suppressed is that an electrical triple point (a triple junction, hereinafter referred to as a TJ part 45) is formed at a boundary point between the connection fitting 41A, the voltage detector 7 as an insulator, and a gas such as air or an insulating gas. For this reason, extreme local electric field concentration is caused in the TJ part 45, and creeping discharge triggered by partial discharge in the TJ part 45 may occur.

In order not to cause local electric field concentration in the TJ part 45, it is necessary to arrange a component such that an electric line does not locally enter or exit an insulator. For this purpose, a contact angle of the TJ part 45 formed by the connection fitting 41A and the voltage detector 7 is important. Specifically, assuming that a contact angle that is an angle formed by the connection fitting 41A and the voltage detector 7 is a contact angle θ, the contact angle θ is preferably 90 degrees or more. Here, chamfering processing is performed on an end of the connection fitting 41A in order to reduce the electric field strength. For example, in the connection fitting 41A, chamfering processing is performed on a bottom side of the back surface part 46. In this case, the contact angle θ formed by the connection fitting 41A and the voltage detector 7 is smaller than 90 degrees. Therefore, in the fourth embodiment, a spacer is provided between the connection fitting 41A and the voltage detector 7 such that the contact angle θ of the TJ part 45 does not become an acute angle.

Figure 10:
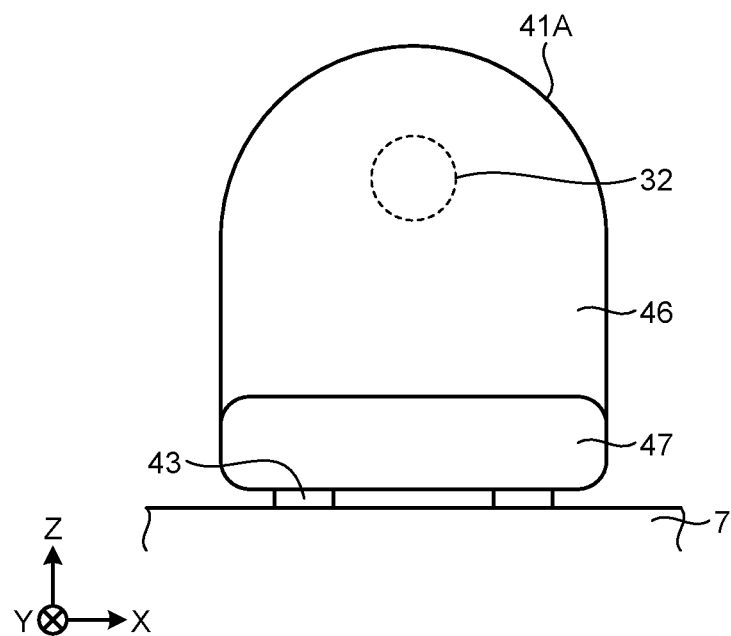
FIG. 10 is a view illustrating a second connection configuration example of the voltage detector and the connection fitting included in the voltage generator according to the fourth embodiment.

FIG. 10 is a view illustrating a second connection configuration example of the voltage detector and the connection fitting included in the voltage generator according to the fourth embodiment. FIG. 10 illustrates a front view of the voltage detector 7 and the connection fitting 41A.

In the connection configuration example illustrated in FIG. 10, a spacer 43 is disposed between the connection fitting 41A and the voltage detector 7 such that the contact angle θ formed by the connection fitting 41A and the voltage detector 7 is not smaller than 90 degrees. The spacer 4 described in the third embodiment is a first spacer, and the spacer 43 is a second spacer.

As illustrated in FIG. 10, the spacer 43 such as, for example, a washer is disposed between the connection fitting 41A and the voltage detector 7 to provide a gap between the connection fitting 41A and the voltage detector 7.

As a result, a position of the TJ part 45 is not a boundary point formed by the connection fitting 41A and the voltage detector 7 but a boundary point formed by the connection fitting 41A and the spacer 43 and a boundary point formed by the voltage detector 7 and the spacer 43. As a result, electric field concentration in the TJ part 45 is alleviated, and creeping discharge can be suppressed.

Note that the spacer 43 may be a conductor or a non-conductor. When the spacer 43 is a conductor, the contact angle θ of the TJ part 45 between the spacer 43 and the voltage detector 7 is 90 degrees. When the spacer 43 is a non-conductor, the contact angle θ of the TJ part 45 between the spacer 43 and the connection fitting 41A is 90 degrees.

In addition, since the spacer 43 is disposed on an inner side of the bottom surface 47 with respect to the bottom surface 47 of the connection fitting 41A, an influence of the connection fitting 41A becomes dominant, and an electric field of the TJ part 45 is reduced. In other words, when the spacer 43 is disposed so as to be covered by the bottom surface 47 of the connection fitting 41A, that is, the spacer 43 is disposed so as not to protrude from the bottom surface 47 when the bottom surface 47 is viewed from above, discharge in the air from the spacer 43 can be prevented.

Note that, since the spacer 43 is disposed for the purpose of providing a gap between the connection fitting 41A and the voltage detector 7, the number and a shape of the spacers 43 are not limited. The spacer 43 is formed by, for example, a plate-shaped member having a ring shape.

Figure 11:
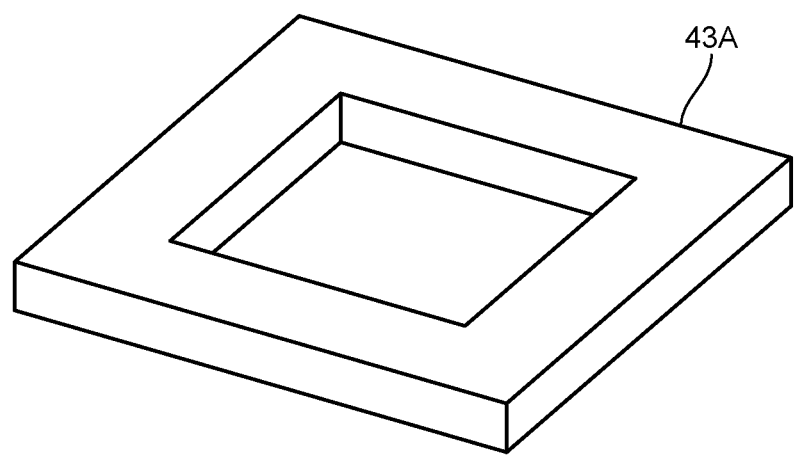
FIG. 11 is a perspective view illustrating a first configuration example of a spacer included in the voltage generator according to the fourth embodiment.

FIG. 11 is a perspective view illustrating a first configuration example of the spacer included in the voltage generator according to the fourth embodiment. A spacer 43A, which is a first configuration example of the spacer 43, is formed by a plate-shaped member having a polygonal ring shape such as a rectangular ring shape. Note that the spacer 43A may be formed by a plate-shaped member having a triangular ring shape, or may be formed by a plate-shaped member having a polygonal ring shape of a pentagon or more.

Figure 12:
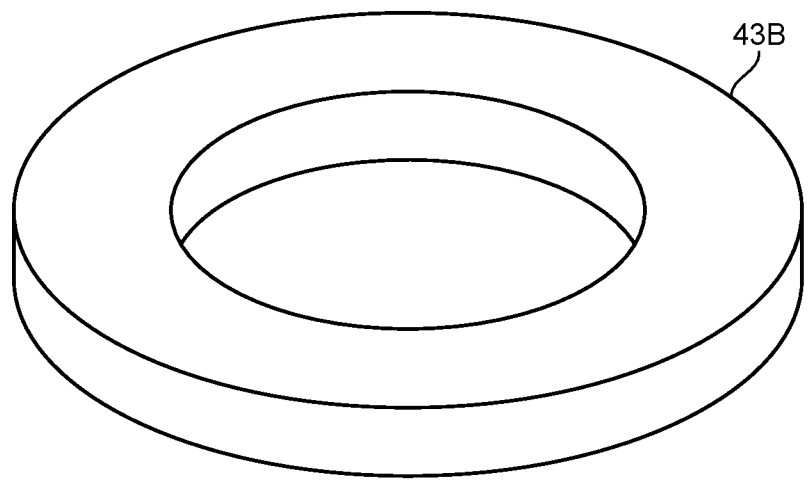
FIG. 12 is a perspective view illustrating a second configuration example of the spacer included in the voltage generator according to the fourth embodiment.

FIG. 12 is a perspective view illustrating a second configuration example of the spacer included in the voltage generator according to the fourth embodiment. A spacer 43B, which is a second configuration example of the spacer 43, is formed by a circular plate-shaped plate.

Figure 13:
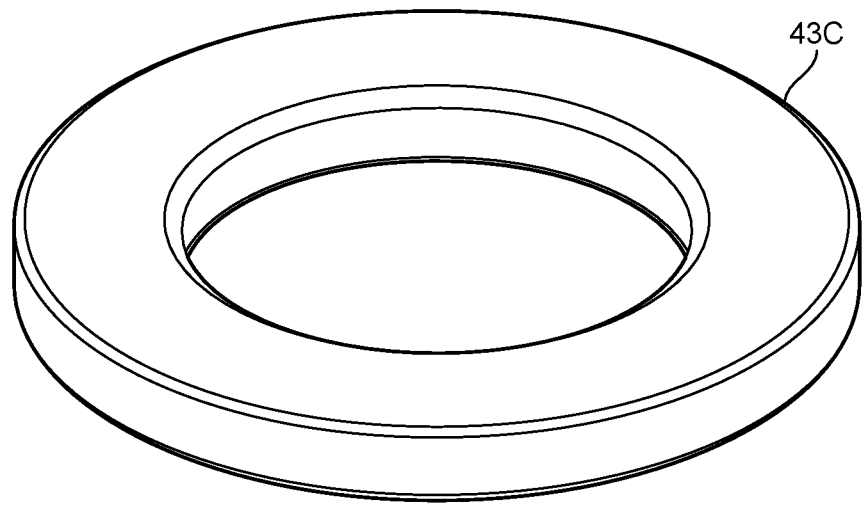
FIG. 13 is a perspective view illustrating a third configuration example of the spacer included in the voltage generator according to the fourth embodiment.

FIG. 13 is a perspective view illustrating a third configuration example of the spacer included in the voltage generator according to the fourth embodiment. In a spacer 43C, which is a third configuration example of the spacer 43, a corner portion of the spacer 43B is scraped off. In other words, chamfering processing is performed on the spacer 43C with respect to the spacer 43B. In this way, the spacer 43C has a circular shape in which an electric field strength of the spacer 43 alone is minimized, and is subjected to chamfering processing.

Figure 14:
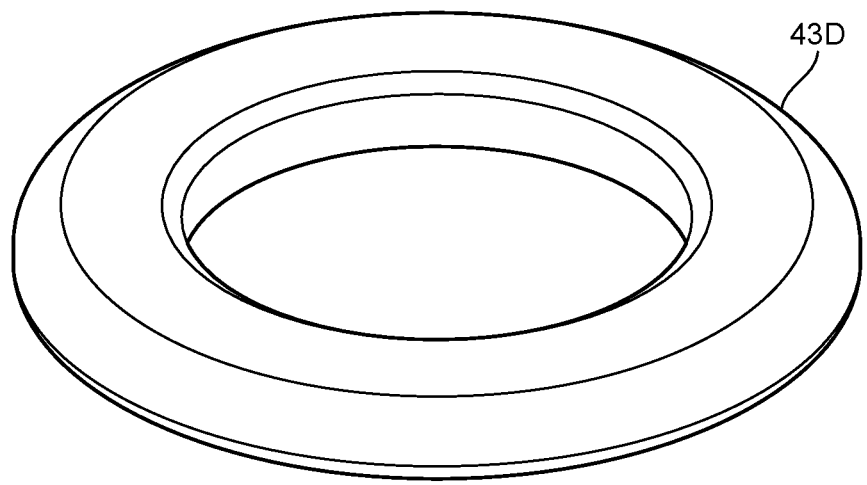
FIG. 14 is a perspective view illustrating a fourth configuration example of the spacer included in the voltage generator according to the fourth embodiment.

FIG. 14 is a perspective view illustrating a fourth configuration example of the spacer included in the voltage generator according to the fourth embodiment. In a spacer 43D, which is a fourth configuration example of the spacer 43, an inner side of a top surface and an inner side of a bottom surface of a corner portion of the spacer 43B are scraped off. Further, the spacer 43D is processed such that an outer side surface bulges outward. By the spacer 43C formed by a plate-shaped member of a circular ring shape and subjected to chamfering processing, and the spacer 43D formed by a plate-shaped member of a circular ring shape and chamfered and bulged outward, the electric field strength can be reduced as compared with the spacers 43A and 43B.

As described above, in the fourth embodiment, in addition to the configurations of the first to third embodiments, the spacer 43 is disposed between the connection fitting 41A and the voltage detector 7, so that the electric field of the high-voltage portion 7A can be alleviated as compared with the first to third embodiments. Therefore, in the fourth embodiment, creeping discharge can be suppressed as compared with the first to third embodiments.

The configurations illustrated in the above embodiments illustrate one example and can be combined with another known technique, and it is also possible to combine embodiments with each other and omit and change a part of the configuration without departing from the subject matter of the present invention.

REFERENCE SIGNS LIST

1 sealed case; 2A, 2B support column; 4, 43, 43A to 43D spacer; 5 high-voltage transformer; 7, 7x, 7y voltage detector; 7A, 7Ax, 7Ay high-voltage portion; 7B, 7Bx, 7By low-voltage portion; 8, 8y baseplate; 9 power supply device; 10, 35 connection point; 20A, 20B axis; 31 resistive voltage divider; 32 short-circuit current suppressive resistor; 33 voltage-dividing resistor; 41A connection fitting; 45 TJ part; 46 back surface part; 47 bottom surface; 61 to 63 booster circuitry; 65 output terminal; 71, 73, 81 first rectangular area; 72, 74, 82 second rectangular area; 75 rectangular ring area; 76 central area; 77 third rectangular area; 101, 102 voltage generator; C1 center.

The invention claimed is:

1. A voltage generator comprising:
a case having a ground potential;
a high-voltage transformer housed in the case and adapted to boost a voltage;
a booster circuitry housed in the case and adapted to boost a voltage outputted from the high-voltage transformer; and
a voltage detector housed in the case and adapted to detect a voltage boosted by the booster circuitry, wherein a first creepage path includes a first bent path that is a bent path, the first creepage path being a path from a first high-voltage portion that is a portion to which a highest voltage is applied in the voltage detector, to a ground point having an equal potential to the case.

2. The voltage generator according to claim 1, wherein
the voltage detector includes a first rectangular area and a second rectangular area when viewed from a top surface side of the first creepage path,
the first high-voltage portion is disposed in the first rectangular area, and
the first creepage path is a path being bent at a boundary position between the first rectangular area and the second rectangular area and reaching the ground point through the second rectangular area.

3. The voltage generator according to claim 2, wherein
the first creepage path is a path bent in an L shape at a boundary position between the first rectangular area and the second rectangular area when viewed from a top surface side of the first creepage path.

4. The voltage generator according to claim 1, wherein
the voltage detector includes a first rectangular area, a second rectangular area, and a rectangular ring area when viewed from a top surface side of the first creepage path,
the first high-voltage portion is disposed in the first rectangular area, and
the first creepage path is a path:
  passing from the first rectangular area to the second rectangular area;
  being bent at a boundary position between the second rectangular area and the rectangular ring area;
  being bent in the rectangular ring area; and
  reaching the ground point.

5. The voltage generator according to claim 4, wherein
the first creepage path is a path bent in an L shape at a boundary position between the first rectangular area and the second rectangular area when viewed from a top surface side of the first creepage path.

6. The voltage generator according to claim 1, further comprising:
a baseplate having an insulation property and having a top surface parallel to a bottom surface of the voltage detector; and
a first spacer having an insulation property and disposed at a specific position between the baseplate and the voltage detector to cause the voltage detector and the baseplate to be disposed apart from each other by a specific interval, wherein
the first spacer extends from a top surface of the baseplate toward a bottom surface of the voltage detector, and
the first creepage path is a path passing from the first high-voltage portion to the first spacer, being bent at a boundary position between the first spacer and the baseplate, and reaching the ground point through the baseplate.

7. The voltage generator according to claim 6, wherein
the baseplate includes a first rectangular area and a second rectangular area when viewed from a top surface side of the first creepage path, and
the first creepage path includes a second bent path being bent at a boundary position between the first rectangular area and the second rectangular area and reaching the ground point through the second rectangular area.

8. The voltage generator according to claim 7, wherein
the first creepage path is a path bent in an L shape at a boundary position between the first rectangular area and the second rectangular area when viewed from a top surface side of the first creepage path.

9. The voltage generator according to claim 1, wherein
second high-voltage portion that is a portion to which a highest voltage is applied in the booster circuitry, to the ground point.

10. The voltage generator according to claim 1, wherein
an inside of the case is filled with an insulating layer having higher insulation performance than air.

11. The voltage generator according to claim 1, wherein
the voltage detector includes:
a resistive voltage divider, including a plurality of voltage-dividing resistors connected in series, and adapted to divide and extract a voltage boosted by the booster circuitry;
a short-circuit current suppressive resistor connected to an output terminal of the booster circuitry, the resistive voltage divider, and a load side, wherein
the short-circuit current suppressive resistor is adapted to suppress a short-circuit current; and
a connection fitting connected to the short-circuit current suppressive resistor and the booster circuitry.

12. The voltage generator according to claim 11, wherein
the voltage detector includes:
a second spacer disposed between the connection fitting and the booster circuitry and adapted to form a gap between the connection fitting and the booster circuitry.

13. The voltage generator according to claim 12, wherein
the second spacer is disposed at a position not protruding from a bottom surface of the connection fitting when viewed from above the connection fitting.

14. The voltage generator according to claim 12, wherein
the second spacer is formed by performing chamfering processing on a corner portion of a circular plate-shaped plate.

15. The voltage generator according to claim 12, wherein
the second spacer is a conductor.

16. The voltage generator according to claim 15, wherein
a contact angle between the second spacer and the voltage detector is 90 degrees.

17. The voltage generator according to claim 11, wherein
at least one piece of the connection fitting is included in the first high-voltage portion.

* * * * *